No. 859,399.

PATENTED JULY 9, 1907.

B. MARTIN.
VALVE SEAT.
APPLICATION FILED MAY 21, 1906.

Witnesses

Inventor
B. Martin
By R.H.A.P. Lacey,
Attorneys

UNITED STATES PATENT OFFICE.

BRADFORD MARTIN, OF WASHINGTON, PENNSYLVANIA.

VALVE-SEAT.

No. 859,399.

Specification of Letters Patent.

Patented July 9, 1907.

Application filed May 21, 1906. Serial No. 318,003.

*To all whom it may concern:*

Be it known that I, BRADFORD MARTIN, a citizen of the United States, residing at Washington, in the county of Washington and State of Pennsylvania, have invented certain new and useful Improvements in Valve-Seats, of which the following is a specification.

The object of the present invention is to provide an improved valve seat which is extremely simple in construction and which is peculiarly designed so that it can be easily and quickly removed from position in the valve for repairing or other purposes.

To this end the valve seat comprises essentially a disk which is held removably in position between two sections of the valve casing and which is provided with an opening surrounded by an annular flange which projects outwardly and forms a rest for the valve.

Figure 1:
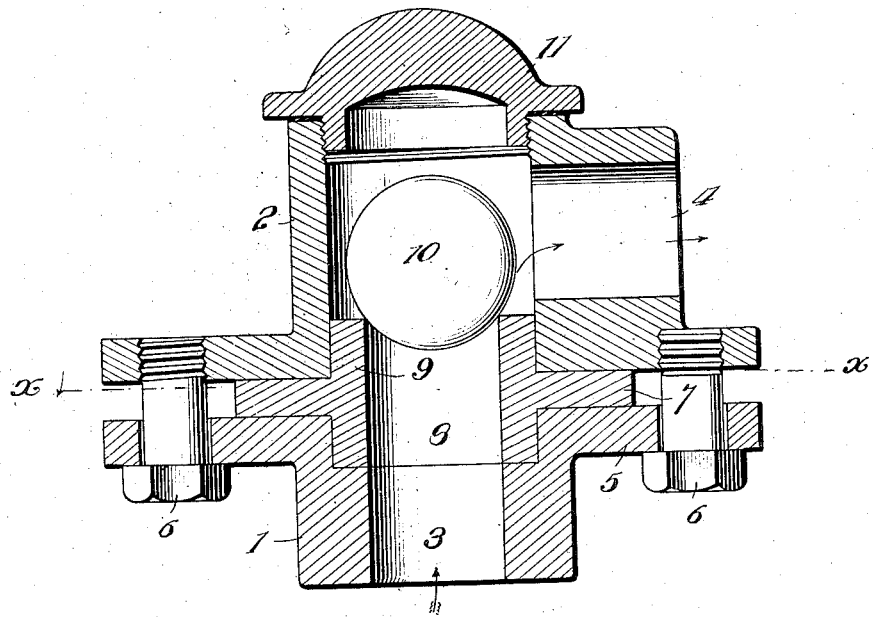
Figure 2:
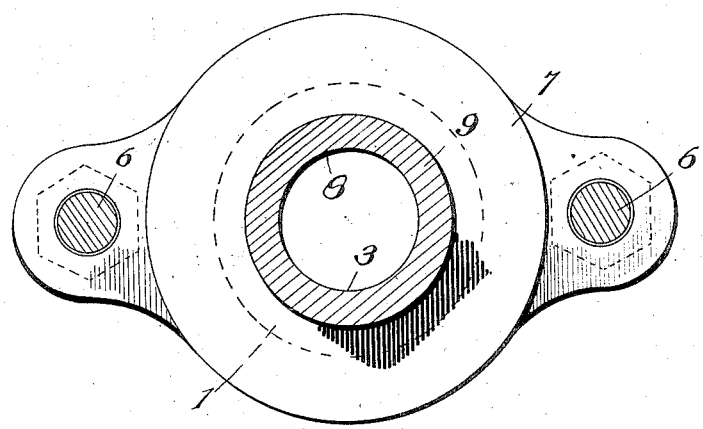

For a full description of the invention and the merits thereof and also to acquire a knowledge of the details of construction of the means for effecting the result, reference is to be had to the following description and accompanying drawings, in which:

Figure 1 is a vertical sectional view through a check valve provided with the improved valve seat; and Fig. 2 is a transverse sectional view on the line x—x of Fig. 1, looking in the direction of the arrows.

Corresponding and like parts are referred to in the following description and indicated in all the views of the drawings by the same reference characters.

While the valve seat may be employed in connection with any suitable types of valves, it is shown as used with a check valve, such as are found upon steam boilers, or where it is necessary to pump against pressure. The valve casing is formed in two sections 1 and 2, the section 1 being provided with an inlet opening 3, while the section 2 is provided with the outlet opening 4. An outwardly extending annular flange 5 is located at the meeting portion of each of the sections 1 and 2, and these flanges 5 are adapted to be clamped together by means of the fastening members or bolts 6. The valve seat itself is in the form of a circular disk 7 having a central circular opening 8 which forms the orifice through which the liquid passes. This disk 7 is clamped in position between the flanges 5 at the junction of the two valve sections so that the opening 8 registers with the inlet passage 3. Each side of the disk 7 is formed with an outwardly projecting annular flange 9 surrounding the opening 8 and forming the seat upon which the valve 10 normally rests, the said valve being preferably in the form of a ball, as shown in the drawings. When the valve seat is arranged within the casing, one of the flanges 9 is designed to fit against the inner sides of the section 2 of the casing, while the opposite flange 9 fits within a recess in the section 1 and is preferably flush with the inlet opening as shown. It will thus be seen that the flanges serve the double function of constituting a valve seat and also of holding the disk 7 against lateral displacement. Should the valve seat at any time become worn so as to result in leakage, it can be readily removed for repair by loosening the screws 6 and separating the two sections of the valve casing. Owing to the fact that the two flanges 9 are identical in form, and are coextensive with the recess in the section 1 it will also be apparent that the disk 7 can be reversed and both of the flanges utilized as a valve seat. In the present instance, it will be observed that the section 2 of the casing is formed with an opening in alinement with the inlet passage 3 and which is closed by the removable plug 11. By removing the plug ready access can be had at any time to the valve for cleaning or similar purposes.

Having thus described the invention, what is claimed as new is:

In a device of the character described, the combination of a valve casing formed in two sections provided at their juncture with outwardly projecting flanges, each of said sections having a passage extending therethrough and said passages normally being in alinement, the passage through one of the sections of the valve casing having a lateral opening in communication therewith and having the mouth thereof closed by a removable plug, while the opposite section is formed at its inner end with an annular recess, fastening means connecting the outwardly projecting flanges of the two sections of the valve casing, and a reversible disk interposed between the said flanges, said disk having an opening therein which is surrounded by annular flanges projecting outwardly from opposite sides thereof, each of the said flanges being designed to be used as a valve seat and being coextensive with the recess in one of the casing sections and designed to fit within the said recess.

In testimony whereof I affix my signature in presence of two witnesses.

BRADFORD MARTIN. [L. S.]

Witnesses:
EMMET M. ADAIR.
MARY L. STEWART.